United States Patent
Han et al.

(10) Patent No.: US 8,330,920 B2
(45) Date of Patent: Dec. 11, 2012

(54) FRINGE FIELD SWITCHING LIQUID CRYSTAL DISPLAY COMPRISING A PIXEL ELECTRODE HAVING FINGER PORTIONS THAT FORM FIRST AND SECOND ELECTRODE ANGLES

(75) Inventors: Sanghun Han, Gunpo-si (KR); Sunwoo Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 161 days.

(21) Appl. No.: 12/591,838

(22) Filed: Dec. 2, 2009

(65) Prior Publication Data

US 2010/0141885 A1    Jun. 10, 2010

(30) Foreign Application Priority Data

Dec. 8, 2008 (KR) .......... 10-2008-0124241

(51) Int. Cl.
   *G02F 1/1343* (2006.01)
(52) U.S. Cl. ....................... 349/141; 349/142
(58) Field of Classification Search .......... 349/141, 349/145, 146, 139, 142–144
   See application file for complete search history.

(56) References Cited

U.S. PATENT DOCUMENTS

| 2001/0005238 A1 | 6/2001 | Yun et al. | |
| 2003/0043327 A1* | 3/2003 | Aoyama et al. | 349/141 |
| 2007/0002244 A1* | 1/2007 | Park et al. | 349/141 |
| 2009/0046234 A1* | 2/2009 | Tanaka | 349/141 |

FOREIGN PATENT DOCUMENTS

KR    2001-0064405    7/2001

* cited by examiner

*Primary Examiner* — Mark Robinson
*Assistant Examiner* — Paul Lee
(74) *Attorney, Agent, or Firm* — McKenna Long & Aldridge, LLP

(57) ABSTRACT

A liquid crystal display of a fringe field switching type is disclosed which can prevent generation of display stains upon application of an external pressure. The liquid crystal display of a fringe field switching type includes: a gate line; a data line; a TFT connected to the gate line and the data line; a pixel electrode connected to the TFT to receive a data signal; a common line for supplying a common voltage; and a common electrode electrically connected to the common line and formed in a plate shape, wherein the domains are vertically symmetrical with respect to a domain border area, and the pixel electrode includes a plurality of finger portions spaced apart from one another by a predetermined gap to form a fringe field together with the common electrode and a border link pattern connecting the finger portions at the domain border area.

4 Claims, 6 Drawing Sheets

FRINGE FIELD SWITCHING LIQUID CRYSTAL DISPLAY COMPRISING A PIXEL ELECTRODE HAVING FINGER PORTIONS THAT FORM FIRST AND SECOND ELECTRODE ANGLES

This application claims the benefit of Korean Patent Application NO. 10-2008-0124241 filed on Dec. 8, 2008, which is incorporated herein by reference for all purposes as if fully set forth herein.

BACKGROUND OF THE INVENTION

1. Field of the Invention

This document relates to a liquid crystal display, and more particularly, to a liquid crystal display of a fringe field switching type which can prevent generation of display stains upon application of an external pressure.

2. Discussion of the Related Art

Generally, a liquid crystal display (LCD) controls light transmittance of liquid crystal material using an electric field to display a picture. The liquid crystal displays are largely classified into a vertical electric field type and a horizontal electric field type depending on a direction that the electric field drives the liquid crystal material.

The vertical electric field applying type LCD drives a liquid crystal material in a twisted nematic (TN) mode where a vertical electric field is formed between a pixel electrode and a common electrode arranged opposite to each other on the upper and lower substrates. The vertical electric field applying type LCD has an advantage of a large aperture ratio while having a drawback of a narrow viewing angle of about 90°. The horizontal electric field applying type LCD drives a liquid crystal material in an in-plane switch (IPS) mode where a horizontal electric field is formed between the pixel electrode and the common electrode arranged in parallel to each other on the lower substrate. The horizontal electric field applying type LCD has an advantage of a wide viewing angle of about 160° while having a drawback of low aperture ratio and transmittance.

Recently, in order to overcome the disadvantage of the horizontal electric field applying type LCD, there has been suggested a liquid crystal display of a fringe field switching (hereinafter, referred to as "FFS") type operated by a fringe field.

FIG. 1 shows a pixel area P in a FFS type liquid crystal display. Referring to FIG. 1, the FFS type liquid crystal display includes a data line DL and a gate line GL formed to cross each other, a thin film transistor (hereinafter, referred to as "TFTs) connected to a crossing of the data and gate lines DL and GL, a pixel electrode 16 provided at a pixel area P defined by the crossing structure of the data and gate lines DL and GL and connected to the TFT, a common electrode 2 provided at the pixel area P to form a fringe field together with the pixel electrode 16, and a common line 6 connected to the common electrode 2. The pixel electrode 16 includes a plurality of finger portions 16b and connecting portions 16a for commonly connecting the finger portions 16b at opposite ends of the finger portions 16b. The common electrode 2 is formed in a plate shape under the pixel electrode 16, with a gate insulating film and a protective film interposed therebetween, to form a fringe filed together with the finger portions 16b of the pixel electrode 16.

Such a FFS type liquid crystal display divides the pixel area P for displaying images into two domains D1 and D2 in order to prevent image distortion caused by viewing angle dependency. The pixel electrode is bent at a domain borderline B that separates the first and second domains D1 and D2 from each other. An electrode angle θ formed between the pixel electrode and a normal line (N) perpendicular to the domain borderline B is equal at each of the domains D1 and D2. This electrode angle θ is determined by initial design values. A driving voltage for driving liquid crystal can be reduced because the smaller the electrode angle θ, the larger the movement angle of the liquid crystal with respect to an applied voltage. And, the average director of the liquid crystal at low-transmittance areas of the electrode and the electrode gap center is close to 45°, and hence the brightness can be increased. Accordingly, there is a recent trend towards reducing the electrode angle θ to less than 15° in order to decrease driving voltage and increase brightness.

However, if the electrode angle θ is reduced, the liquid crystal collapses because it cannot maintain its original posture due to an external pressure, thus producing display stains as shown in FIG. 2. The electrode angle θ is deeply related to a torque of the liquid crystal as shown in the following Table 1. The smaller the electrode angle, the smaller the torque of the liquid crystal. Thus, it is difficult for liquid crystals to maintain orientation relative to their posture against an external force.

TABLE 1

| Angle | Torque (a.u.) |
|---|---|
| 10 degrees | 0.34 |
| 15 degrees | 0.50 |
| 20 degrees | 0.64 |
| 25 degrees | 0.77 |
| 30 degrees | 0.87 |

Accordingly, as shown in FIG. 3, when an external pressure is applied to a display panel in a white gray scale, if a torque (To) caused by the external force is larger than an intrinsic torque (Tlc) of the liquid crystal, the orientation of the liquid crystal at the portion where the external pressure is applied cannot restore the original state but is kept in the state in which the external pressure is applied. This brings about domain differences with a portion where no external pressure is applied (a portion where an external pressure is applied is denoted by domain 1, and a portion where no external pressure is applied is denoted by domain 2), thereby causing a difference in color range depending on a viewing angle. FIG. 4 shows an example in which, if an external pressure is applied to the display panel in a white gray scale, luminance is reduced due the collapse of the border area between the domains in the external-pressure-applied area and thus display stains appear.

SUMMARY OF THE INVENTION

An aspect of this document is to provide a liquid crystal display of a fringe field switching type which can prevent generation of display stains upon application of an external pressure.

To achieve the above aspect, there is provided a liquid crystal display of a fringe field switching type, which divides a pixel area into two domains having different movements of liquid crystal, according to an exemplary embodiment of the present invention, including: a gate line formed on a substrate; a data line crossing the gate line with a gate insulating film interposed therebetween to define the pixel area; a TFT connected to the gate line and the data line; a pixel electrode connected to the TFT to receive a data signal; a common line for supplying a common voltage; and a common electrode electrically connected to the common line and formed in a plate shape to cover the pixel area, wherein the domains are vertically symmetrical with respect to a domain border area, and the pixel electrode includes a plurality of finger portions spaced apart from one another by a predetermined gap to form a fringe field together with the common electrode and a border link pattern connecting the finger portions at the domain border area.

The finger portions in the first and second domain areas form a first electrode angle with respect to a normal line perpendicular to the domain borderline B crossing the domain border area, and the finger portions in the domain border area form a second electrode angle with respect to the normal line, the second electrode angle being larger than the first electrode angle.

The first electrode angle is set to less than 15°.

The pixel electrodes further include: a first body portion partially overlapping with the common electrode and the common line in a lower end portion of the pixel area and connecting the finger portions of the second domain; and a second body portion overlapping with the common electrode in an upper end portion of the pixel area and connecting the finger portions of the first domain.

The first body portion electrically contacts the drain electrode of the TFT which is exposed by a passivation hole passing through a protective film.

BRIEF DESCRIPTION OF THE DRAWINGS

The accompanying drawings, which are included to provide a further understanding of the invention and are incorporated on and constitute a part of this specification illustrate embodiments of the invention and together with the description serve to explain the principles of the invention.

In the drawings.

DETAILED DESCRIPTION OF THE EMBODIMENTS

Hereinafter, an implementation of this document will be described in detail with reference to FIGS. 5 to 7.

Figure 1:
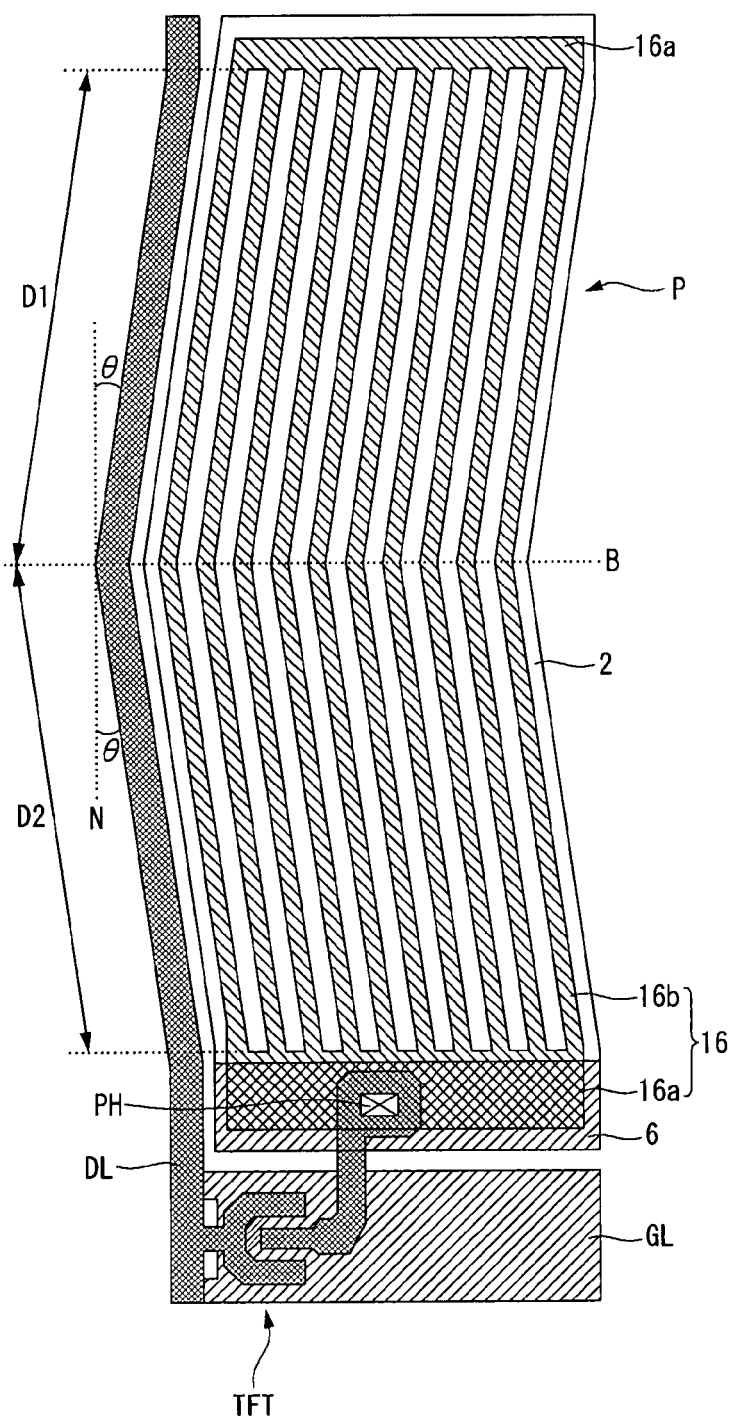
FIG. 1 is a plane view showing one pixel area in a related art liquid crystal display of a FFS type.
Figure 2:
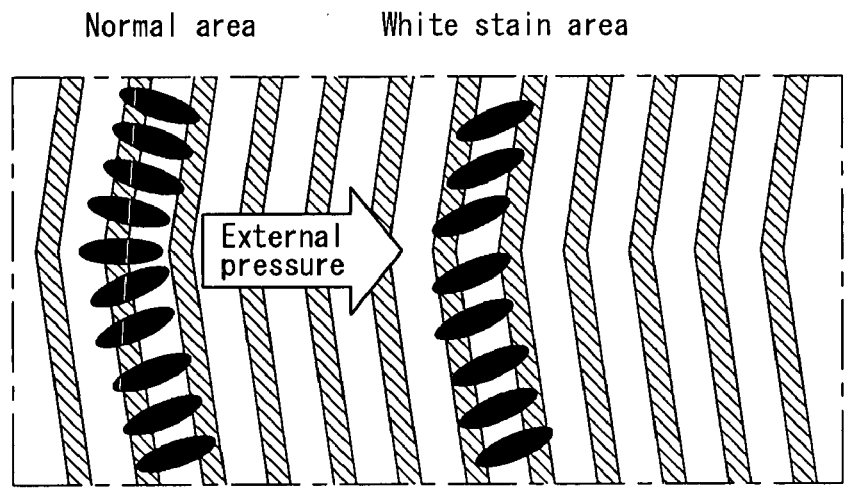
FIG. 2 is a view showing the posture of liquid crystal in a domain border area being collapsed due to an external pressure.
Figure 3:
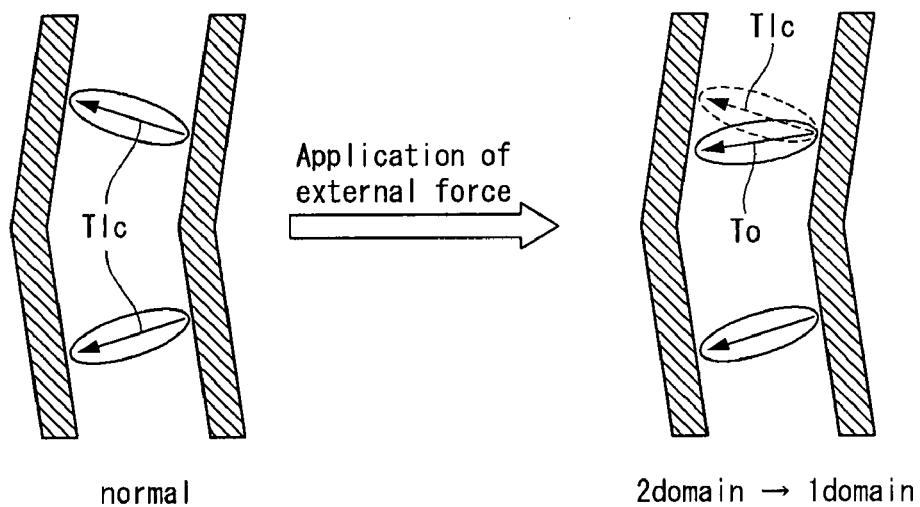
FIG. 3 is a view for explaining the principle of the collapse of the domain border area due to an external pressure.
Figure 4:
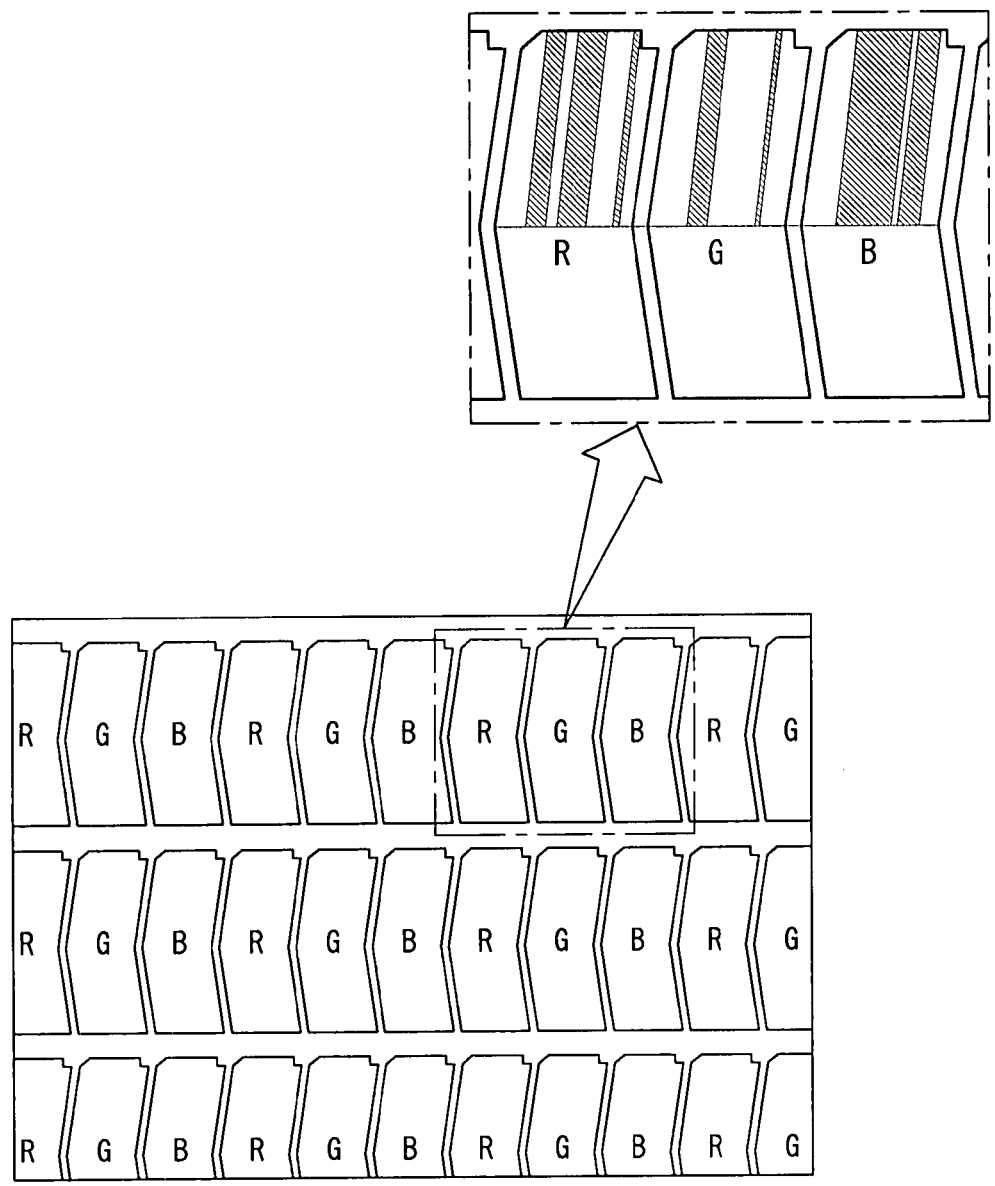
FIG. 4 is a photograph showing an example of display stains produced by the collapse of the domain border area.
Figure 5:
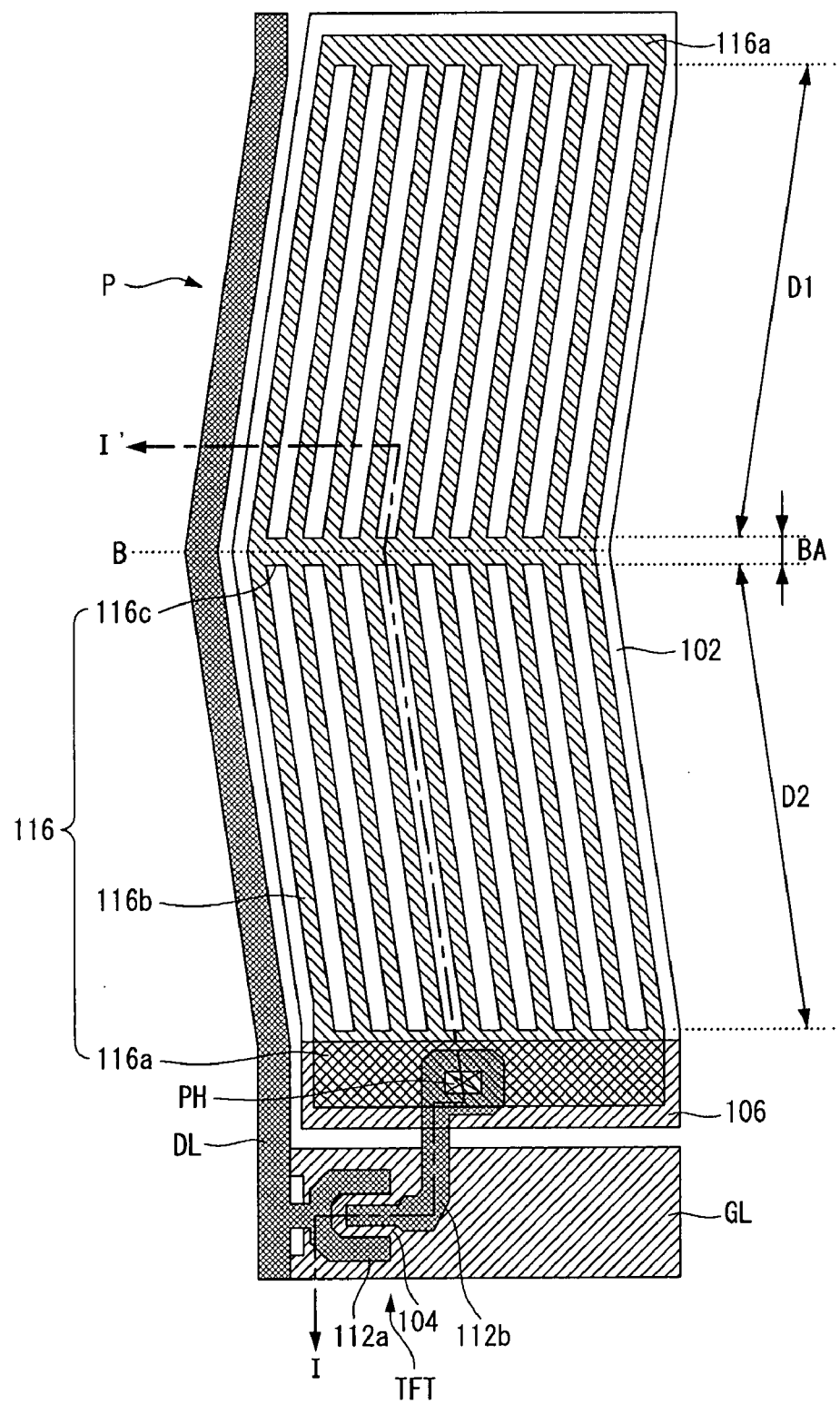
FIG. 5 is a plane view showing one pixel area in a liquid crystal display of a FFS type according to an exemplary embodiment of the present invention.

FIG. 5 is a plane view showing one pixel area in a liquid crystal display of a FFS type according to an exemplary embodiment of the present invention. FIG. 6 is a cross-sectional view taken along line I-I' of FIG. 5. FIG. 7 is a view showing the border between the domains being made distinctive by a border link pattern.

Figure 6:
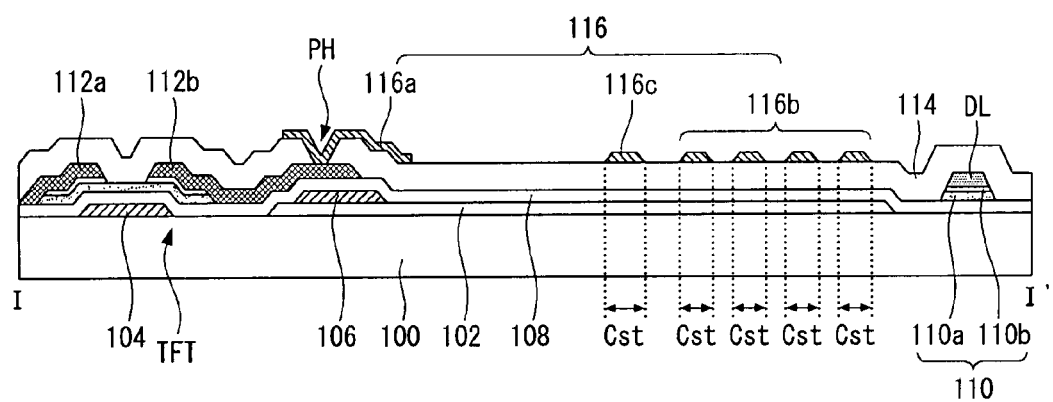
FIG. 6 is a cross-sectional view taken along line I-I' of FIG. 5.
Figure 7:
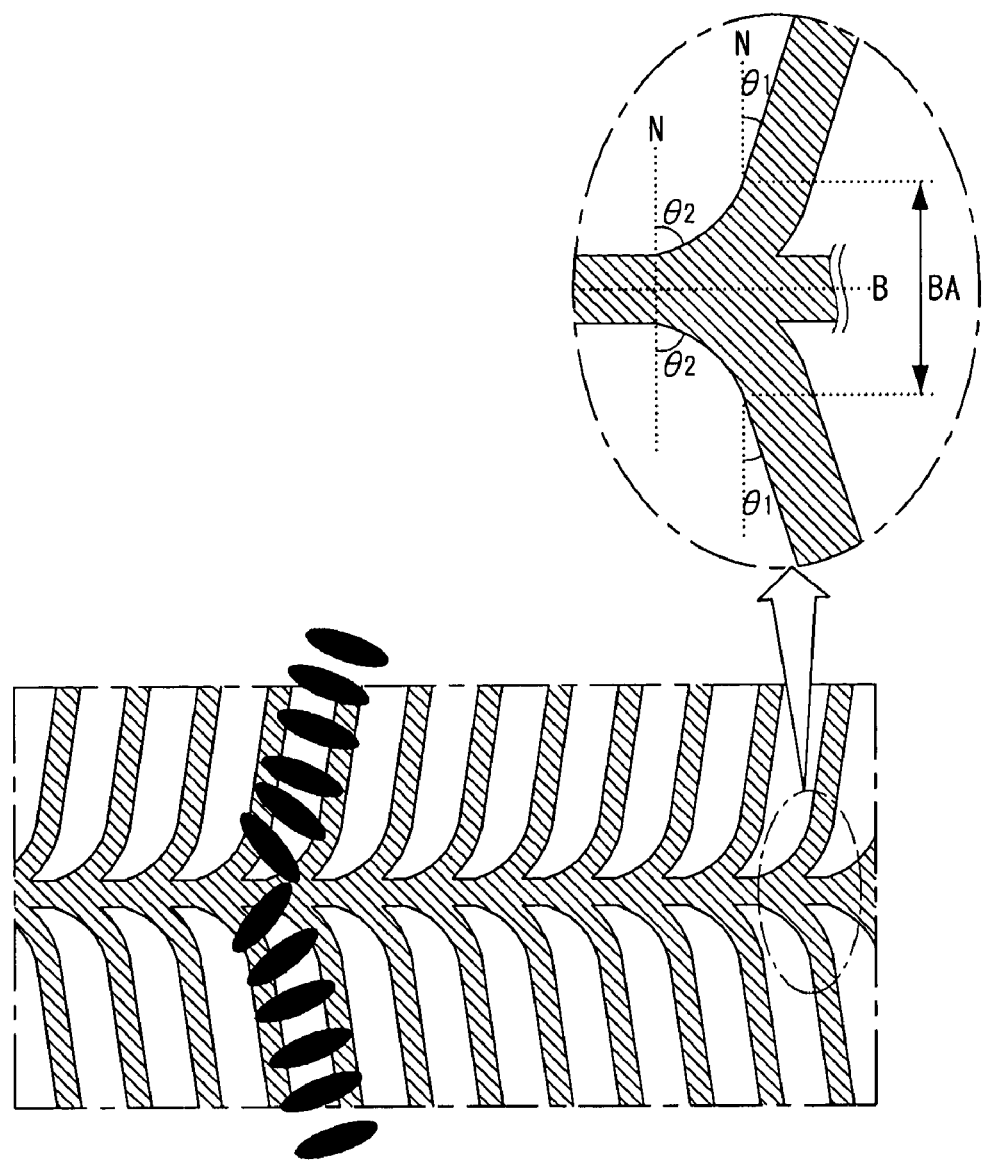
FIG. 7 is a view showing the border between the domains being made distinctive by a border link pattern.

Referring to FIGS. 5 to 7, the liquid crystal display of the fringe fiend switching type according to an exemplary embodiment of the present system includes a gate line GL and a data line DL formed on a lower substrate 100 to cross each other with a gate insulating film 108 interposed therebetween, a TFT connected to a crossing of the data and gate lines GL and DL, a pixel electrode 116 provided at a pixel area P defined by the crossing structure and connected to the TFT, a common electrode 102 provided at the pixel area P to form a fringe field together with the pixel electrode 116, and a common line 106 connected to the common electrode 102. Although not shown, a gate pad connected to the gate line GL and a data pad connected to the data line DL are formed on the lower substrate 100. And, the liquid crystal display of the fringe field switching type includes an upper substrate having a black matrix, a color filter pattern, and an overcoating layer formed thereon and a liquid crystal layer sandwiched between the upper and lower substrates.

Such a liquid crystal display of the fringe field switching type divides the pixel area P displaying an image into two domains D1 and D2 in order prevent color distortion caused by viewing angle dependency. The movement directions of the liquid crystal in the first domain D1 and second domain D2 differ from each other.

The gate line GL supplies a scan signal from a gate driver to the TFT, and the data line DL supplies a video signal from a data driver to the TFT. The gate line GL and the data line DL cross each other with the gate insulating film 108 interposed therebetween to define each pixel area P. The gate line GL may be formed from a gate metal layer having a single-layer or multi-layer structure of Al, MO, Cr, Cu, Al alloy, Mo alloy, Cu alloy, etc. The data line DL may be formed from a data metal layer having a single-layer or multi-layer structure of Al, MO, Cr, Cu, Al alloy, Mo alloy, Cu alloy, etc.

The TFT supplies a pixel signal, which is supplied to the data line DL, thereby to the pixel electrode 116 in response to a scan signal supplied to the gate line GL. To this end, the TFT includes a gate electrode 104 included in the gate line GL, a source electrode 112a connected to the data line DL, a drain electrode 112b facing the source electrode 112a and connected to the pixel electrode 116, an active layer 110a overlapping with the gate line GL with the gate insulating film 152 therebetween to define a channel between the source electrode 112a and the drain electrode 112b, and an ohmic contact layer 110b formed on the active layer 110a other than the channel portion to form an ohmic contact with the source electrode 112a and the drain electrode 112b. Further, a semiconductor layer 110 including the active layer 110a and the ohmic contact layer 110b is overlapped along the data line DL. Here, the gate insulating film 108 is formed of an inorganic insulating material, such as silicon oxide (SiOx) or silicon nitride (SiNx), and the source electrode 112a and the drain electrode 112b may be formed of a data metal layer having a metal single-layer or multi-layer structure of Al, MO, Cr, Cu, Al alloy, Mo alloy, Cu alloy, etc. The semiconductor layer 110 may be formed of either amorphous silicon or polysilicon.

The common electrode 102 and the common line 106 supply a reference voltage for driving the liquid crystal, that is, a common voltage to each pixel.

To this end, the common line 106 is formed in parallel to the gate line GL in a lower end portion of the pixel area P to receive a common voltage from a common voltage supply pad (not shown). Like the gate line GL, the common line 106 may be formed from a gate metal layer having a single-layer or multi-layer structure of Al, MO, Cr, Cu, Al alloy, Mo alloy, Cu alloy, etc.

The common electrode 102 is electrically connected to the common line 106 in a lower end portion of the pixel area P. The common electrode 102 overlaps with the common line 106, and is formed in a plate shape to cover the pixel area P. The common electrode 102 may be formed from a transparent conductive layer, such as indium tin oxide (ITO), indium zinc oxide (IZO), tin oxide (TO), and indium tin zinc oxide (ITZO).

The pixel electrode 116 forms a fringe field together with the common electrode 102 in the pixel area P. To this end, the pixel electrode 116 includes a plurality of finger portions 116b, body portions 116a for commonly connecting the finger portions 116b at opposite ends of the finger portions 116b, and a border link pattern 116c for commonly connecting the finger portions 116b at a border area BA between the domains D1 and D2.

The body portions 116a are divided into a first body portion overlapping with the common electrode 102 and the common line 106 in a lower end portion of the pixel area P and a second body portion overlapping with the common electrode 102 in an upper end portion of the pixel area P. The first body portion electrically contacts the drain electrode 112 which is exposed by a passivation hole PH passing through the protective film 114 on the common electrode 102 and the common line 106.

In the first domain D1, the finger portions 116b form a first electrode angle θ1 with respect to a normal line N perpendicular to the domain borderline B. In the second domain D2, the finger portions 116b form a first electrode angle θ1 with respect to the normal line N perpendicular to the domain borderline B. On the other hand, at the boarder area BA between the domains D1 and D2, the finger portions 116b of the respective domains D1 and D2 form a second electrode angle θ2 with respect to a normal line N perpendicular to the domain borderline B. Here, the first electrode angle θ1 is set to less than 15° in order to reduce the driving voltage for moving the liquid crystal and increasing brightness. The second electrode angle θ2 becomes larger than the first electrode angle θ1 due to the formation of the border link pattern 116c. In this way, if only the second electrode angle θ2 becomes larger, with the first electrode angle θ1 kept the same as in the conventional art, it is possible to prevent the collapse of the border area between the domains caused by application of an external pressure, along with reduction of the driving voltage for moving the liquid crystals and the effect of brightness increase. This is because, if the second electrode angle θ2 increases, the torque of the liquid crystals positioned at the border area BA between the domains D1 and D2 also increases, whereby the liquid crystals' ability to maintain their posture (force to maintain their original orientation) becomes as strong as the increase in torque. The finger portions 116b are spaced apart from each other by a predetermined gap in the respective domains and formed in parallel to each other to thus form a fringe field together with the common electrode 102 formed in a plate shape under them. A storage capacitor Cst is formed in an overlapping area between the finger portions 116b and the common electrode 102 with the protective film 114 and the gate insulating film 108 interposed therebetween. The pixel electrode 116 may be formed from a transparent conductive layer like the transparent conductive layer of the common electrode 102.

Upon receiving video signals through the TFT, the pixel electrode 116 forms a fringe field with the common electrode 102 to which a common voltage is supplied. The liquid crystal molecules aligned in a horizontal direction between the lower substrate having the TFT formed thereon and the upper substrate having a color filter formed thereon are rotated by dielectric anisotropy. Therefore, the transmittance of light transmitted through the pixel area P is varied depending on the degree of rotation of the liquid crystal molecules such that a gray scale can be implemented.

As described in detail above, the liquid crystal display of the fringe field switching type according to the present invention can increase an electrode angle (angle formed between a normal line perpendicular to a domain borderline and a pixel electrode) in a domain border area compared to a low electrode angle in a domain area by dividing a pixel area into two domains having different movements of liquid crystal and forming a border link pattern connecting pixel electrodes to the domain border area. Accordingly, the liquid crystal display of the fringe field switching type according to the present invention can effectively prevent display stains produced by the collapse of the border between the domains caused by application of an external pressure while providing the same effect as that provided in the conventional art.

It will be understood by those skilled in the art that various changes and modifications may be applicable within a range not departing from the technical idea of the invention. Accordingly, the technical scope of the present invention is not limited to the detailed description of the specification, but should be defined by the accompanying claims.

What is claimed is:

1. A liquid crystal display of a fringe field switching type, which divides a pixel area into two domains having different movements of liquid crystal, comprising:
    a gate line formed on a substrate;
    a data line crossing the gate line with a gate insulating film interposed therebetween to define the pixel area;
    a TFT connected to the gate line and the data line;
    a pixel electrode connected to the TFT to receive a data signal;
    a common line for supplying a common voltage; and
    a common electrode electrically connected to the common line and formed in a plate shape to cover the pixel area,
    wherein the domains are vertically symmetrical with respect to a domain border area, and the pixel electrode includes a plurality of finger portions spaced apart from one another by a predetermined gap to form a fringe field together with the common electrode and a border link pattern connecting the finger portions at the domain border area,
    wherein the finger portions in the first and second domain areas form a first electrode angle with respect to a normal line perpendicular to the domain borderline crossing the domain border area, and the finger portions in the domain border area form a second electrode angle with respect to the normal line,
    wherein the second electrode angle is an acute angle, the first electrode angle and the second electrode angle exist as being adjacent to one another in one area of four areas, and the second electrode angle is larger than the first electrode angle, and
    wherein an angle between the border link pattern and the finger portions forming the first electrode angle forms an obtuse angle and an angle between the border link pattern and the finger portions forming the second electrode angle forms an obtuse angle.

2. The liquid crystal display of claim 1, wherein the first electrode angle is set to less than 15°.

3. The liquid crystal display of claim 1, wherein the pixel electrodes further comprises:
    a first body portion partially overlapping with the common electrode and the common line in a lower end portion of the pixel area and connecting the finger portions of the second domain; and
    a second body portion overlapping with the common electrode in an upper end portion of the pixel area and connecting the finger portions of the first domain.

4. The liquid crystal display of claim 3, wherein the first body portion electrically contacts the drain electrode of the TFT which is exposed by a passivation hole passing through a protective film.

* * * * *